3,351,113
HYDRAULIC DIVISION OF FRUITS

Noboru Suzuki, Shizuoka-shi, and Takamitsu Yoshino, Shimizu-shi, Japan, assignors to Shimizu Suisan Kabushiki Kaisha, Shimizu-shi, Japan, a corporation of Japan
Filed Jan. 25, 1965, Ser. No. 427,596
Claims priority, application Japan, Jan. 27, 1964, 39/3,682
14 Claims. (Cl. 146—230)

This invention relates to method of and apparatus for dividing or separating the segments of fruit such as oranges.

Prior to the invention is was necessary to separate the segments of fruit by a manual operation. The operation requires much skill in order to work fast and it is most inefficient steps in the process of canning oranges with the unbroken segments and requires a much larger percentage of workers than the remaining process steps. Consequently, automation of the operation has been investigated but prior to the present invention it was not possible to automatically divide fruit of varying sizes accurately without damaging the segments.

An object of the invention is to overcome such difficulty by employing a jet of fluid which is directed against the peeled fruit which is supported resiliently in water. The fluid jet is at a pressure sufficient to produce whirling of the water and a pressure and vacuum action around the fruit to separate it into segments or pieces.

Another object of the invention is to provide an apparatus for separating fruit such as peeled oranges into segments which includes a frame having at least one pocket with a basket of resilient strings tensioned radially below the edge of the pocket and is located in a water duct, including means to move the pocket and the basket in horizontal and eccentric movement under the level of water, and means to direct fluid under adjusted presssure against the segments of peeled fruit received within the resilient basket from a running conveyor to separate the fruit into segments and to permit movement of the individual segments out of the basket through the spaces between the resilient strings.

In accordance with the method of the invention segmental fruit such as oranges are delivered one at a time into a basket which is submerged in water and has segmental sized openings bounded by resilient elements which may be displaced to enlarge the openings, and directing a fluid jet under pressure against the fruit to break up the fruit into segments and to force the segments through the openings.

Figure 1:
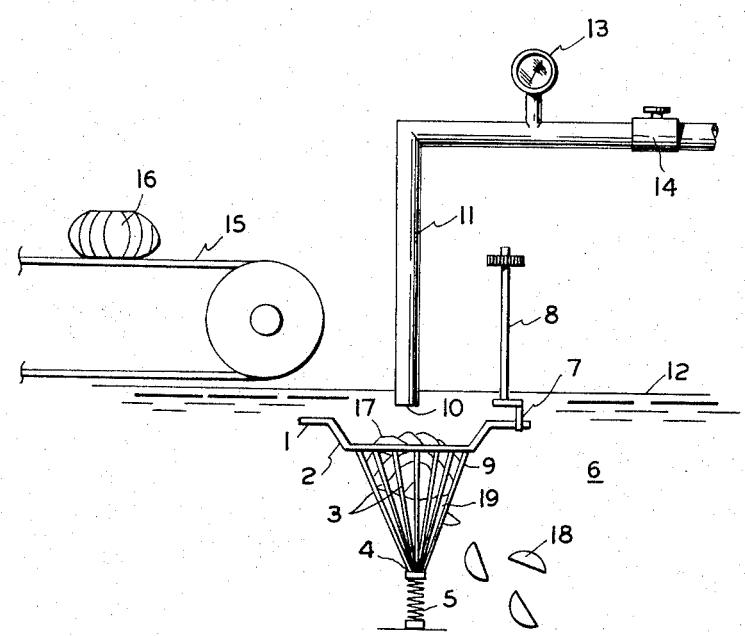
Figure 2:
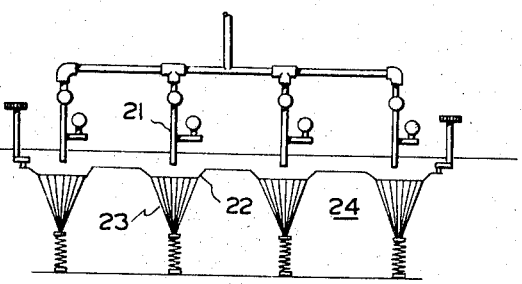

The embodiments of the apparatus according to this invention will now be described with reference to the accompanying drawings, wherein;

FIG. 1 is a side elevational view of a device for separating fruit into its segments constructed in accordance with the invention; and FIG. 2 is a side elevational view of another embodiment of the invention.

As illustrated in FIG. 1, a pocket 2 in a frame 1 has resilient strings or pipes 3 of rubber, plastic or the like of suitable elasticity, which extend from a knot member or flat plate 4 radially upwardly in spaced conical arrangement and under tension to the edge of the pocket 2. The knot member 4 is mounted on a coil-spring 5 which is fixed to the bottom of a water duct or tank 6. A crank 7 is carried at the lower end of a rotatable vertical shaft 8 and a crank arm portion which extends vertically downwardly is connected to the frame 1 as to move horizontally and eccentrically to the shaft 8. The pocket 2 together with a basket 9 formed by the resilient strings 3 which are connected to the frame are imparted with a shaking motion. The discharge opening 10 of an injection pipe or nozzle 11 which contains fluid under pressure is positioned under the level 12 of the water flowing in the tank 6 and is oriented axially above the pocket 2. The pipe 11 is provided with a hydraulic pressure indicating gauge 13 and a valve-cock 14 which is manually operated to adjust pressure of injecting fluid. A moving conveyor 15 is arranged above the frame 1 in a position to feed peeled fruit such as oranges 16 into the basket 19 for a continuous separation of the segments.

The fruit 16 which is supplied by the conveyor 15 drops onto the frame 1 under the level of water 12 in the tank 6 and enters gradually into the basket 9 through the pocket 2 of the frame 1. The frame 1 is given a substantially horizontal circular shaking movement by a crank 7 which is affixed to the lower end of a rotating shaft 8. The end of the crank arm is secured to the plate 1 and the movement of the plate is permitted by its resilient mounting. A discharge opening 10 of the pipe 11 is arranged above the pocket 2 for directing a jet of water or air under adjustable pressure against the segments of fruit 17 supported within the cone-shaped resilient basket 9. The jet is advantageously directed through the axial centre of fruit 17 and then between the adjoining faces of the segments. Thus, the fruit may be instantly separated into pieces or segments without their being impaired. The individual segments 18 are urged by the running water jet to pass through the spaces 19 between the resilient strings 3, and will float away from the basket 9 for transferral from the water tank 6 to a duct where they will be subjected to a process for dissolving the membrane. The pressure of fluid jet which is discharged from the pipe 11 may be suitably adjusted using the indication of pressure by a hydraulic gauge 13 as a valve 14 is regulated to provide a jet pressure set according to the nature of the fruit being handled and will be normally maintained between 0.4 Kg./cm.$^2$ to 0.6 Kg./cm.$^2$.

In the other embodiment according to this invention as shown in FIG. 2, an injecting tube or fluid discharge 21 is arranged over each one of a plurality of pockets each having a resilient basket 23 arranged within a water tank 24. A plurality of conveyors corresponding in number to the baskets 23 are provided for feeding fruit to the individual baskets. And also, the injecting nozzles and the baskets may be constituted in such manner as to be movable.

What we claim is:

1. A device for separating fruit such as peeled oranges into individual segments, comprising a liquid tank, a basket for the fruit submerged in the liquid of the tank and having at least one opening which permits passage of only the individual segments of the fruit but not the whole fruit therethrough, and means for directing a jet of fluid against the fruit to cause breaking up of the fruit into individual segments and the urging of the fruit segments through the opening of the basket into the surrounding liquid of the tank.

2. A device according to claim 1, wherein the basket includes resilient elements forming at least a portion of the boundary of the opening, said resilient elements being deformable to permit enlargement of the opening and the passage of the segments therethrough under the propelling force of the fluid jet.

3. A device according to claim 1, wherein said basket includes an open top for receiving the fruit and a plurality of side openings formed by a plurality of circumferentially spaced elements which converge downwardly from the top of said basket, the spacing between said elements constituting the openings of said basket.

4. A device according to claim 3, wherein said elements of said basket are resilient.

5. A device according to claim 1, wherein said means for directing a jet of fluid includes a fluid conduit having a discharge opening located below the level of the liquid in said liquid tank and directed substantially centrally into said basket toward the fruit therein.

6. A device according to claim 1, including means to move said basket.

7. A device according to claim 6, including a frame, said basket being carried by said frame, said means to move said basket including means connected to said frame to move said frame in a substantially circular horizontal path of movement.

8. A device according to claim 1, including a conveyor disposed over said tank for delivering peeled oranges into said basket.

9. A device according to claim 1, including a plurality of baskets located within said tank, frame means holding said plurality of baskets, and means to move said frame.

10. A device according to claim 9, wherein said means for directing a jet of fluid against the fruit includes a separate conduit for each basket having a discharge located below the level of the liquid in said liquid tank and each being arranged to direct the fluid substantially centrally against the fruit in each basket.

11. A method of separating fruit such as oranges into their individual segments using a basket for the fruit having at least one opening therein, the basket being located in the liquid of a liquid tank comprising positioning a peeled segmental fruit in the basket at a location in which at least a major portion thereof is submerged below the liquid level, and directing a fluid jet against the fruit to cause the fruit to separate into the individual segments and to move the segments as they are broken away through the opening of the basket into the liquid of the liquid tank.

12. A method according to claim 11, wherein the fruit is located in the basket at a location at which it will be entirely submerged below the level of liquid in the liquid tank, and directing the fluid jet through the liquid and against the fruit to be broken up.

13. A method according to claim 11, including shaking the basket as the fluid is being directed against the fruit in order to aid in the breaking up of the fruit into the individual segments and to permit the segments to move out of the openings of the basket.

14. A method according to claim 11, wherein said fluid jet is a water stream which is directed against the fruit at a force sufficient to break up the fruit into segments without damaging the fruit and to direct the segments into the openings of the basket to permit them to be floated in the liquid of said tank.

References Cited
UNITED STATES PATENTS 2,612,889  10/1952  Heyman.
3,081,805  3/1963  Shrewsbury _____ 146—3

ANDREW R. JUHASZ, Primary Examiner.

W. GRAYDON ABERCROMBIE, Examiner.